(12) United States Patent
Vapillon et al.

(10) Patent No.: US 8,837,611 B2
(45) Date of Patent: Sep. 16, 2014

(54) MEMORY-AIDED SYNCHRONIZATION IN A RECEIVER

(75) Inventors: Eric Vapillon, Chateaugiron (FR); Gaetan Guillaume, Laille (FR); Emmanuel Gautier, Betton (FR)

(73) Assignee: Silicon Laboratories Inc., Austin, TX (US)

( * ) Notice: Subject to any disclaimer, the term of this patent is extended or adjusted under 35 U.S.C. 154(b) by 138 days.

(21) Appl. No.: 13/023,707

(22) Filed: Feb. 9, 2011

(65) Prior Publication Data

US 2012/0201332 A1    Aug. 9, 2012

(51) Int. Cl.
    *H04L 27/26*    (2006.01)

(52) U.S. Cl.
    CPC ......... *H04L 27/2685* (2013.01); *H04L 27/2663* (2013.01); *H04L 27/2675* (2013.01); *H04L 27/2665* (2013.01)
    USPC ........................................................ 375/260

(58) Field of Classification Search
    CPC .................................................. H04L 27/2647
    USPC .......... 375/340, 343, 334, 208, 295, 229, 260
    See application file for complete search history.

(56) References Cited

U.S. PATENT DOCUMENTS

| | | | |
|---|---|---|---|
| 5,535,220 A | 7/1996 | Kanno et al. | |
| 5,754,252 A | 5/1998 | Kuhn et al. | |
| 6,128,043 A | 10/2000 | Tulder | |
| 6,542,203 B1 | 4/2003 | Shadwell et al. | |
| 6,625,234 B1 | 9/2003 | Cui et al. | |
| 6,630,964 B2 | 10/2003 | Burns et al. | |
| 6,721,908 B1 | 4/2004 | Kim et al. | |
| 6,862,325 B2 | 3/2005 | Gay-Bellile et al. | |
| 7,039,132 B1 * | 5/2006 | Chen et al. ..................... | 375/334 |
| 7,170,849 B1 | 1/2007 | Arivoli et al. | |
| 7,265,792 B2 | 9/2007 | Favrat et al. | |
| 7,369,835 B2 | 5/2008 | Margairas et al. | |
| 7,426,240 B2 | 9/2008 | Peron | |
| 7,440,392 B2 * | 10/2008 | Hwang et al. ................. | 370/208 |

(Continued)

FOREIGN PATENT DOCUMENTS

| | | |
|---|---|---|
| WO | WO 03067877 | 8/2003 |
| WO | WO 2007001305 | 1/2007 |

OTHER PUBLICATIONS

Slimani, M.; Robert, J.; Zoellner, J., A software-based mobile DVB-T2 measurement receiver, Publication Year: 2012, pp. 1-6, Broadband Multimedia Systems and Broadcasting (BMSB), 2012 IEEE International Symposium, Digital Object Identifier: 10.1109/BMSB.2012.6264238.*

(Continued)

*Primary Examiner* — Daniel Washburn
*Assistant Examiner* — Berhanu Tadese
(74) *Attorney, Agent, or Firm* — Trop, Pruner & Hu, P.C.

(57) ABSTRACT

In one embodiment, a method may include storing information from a first frame of an incoming broadcast signal in a memory coupled to a demodulator, decoding a first preamble symbol of the first frame to determine a transmission mode, accessing at least some of the stored information from the memory and decoding at least one second preamble symbol of the first frame from the accessed information to determine pilot pattern information, and receiving data symbols of the first frame and synchronizing the demodulator based on the received data samples and the pilot pattern information.

19 Claims, 7 Drawing Sheets

(56) References Cited

U.S. PATENT DOCUMENTS

| | | | | |
|---|---|---|---|---|
| 8,027,394 B2* | 9/2011 | Nicolas | ............... | 375/260 |
| 8,223,893 B1* | 7/2012 | Narasimhan | ............... | 375/340 |
| 8,345,791 B2* | 1/2013 | Lele et al. | ............... | 375/295 |
| 8,385,460 B2* | 2/2013 | Ko et al. | ............... | 375/295 |
| 2002/0085648 A1 | 7/2002 | Burns et al. | | |
| 2003/0156654 A1* | 8/2003 | Blat | ............... | 375/260 |
| 2004/0005018 A1* | 1/2004 | Zhu et al. | ............... | 375/340 |
| 2004/0123226 A1 | 6/2004 | Lee et al. | | |
| 2005/0265486 A1 | 12/2005 | Crawley | | |
| 2006/0206778 A1 | 9/2006 | Wehn et al. | | |
| 2006/0222115 A1 | 10/2006 | Dornbusch | | |
| 2006/0239370 A1* | 10/2006 | Mody et al. | ............... | 375/260 |
| 2008/0086671 A1 | 4/2008 | Garg et al. | | |
| 2008/0107168 A1* | 5/2008 | Xia et al. | ............... | 375/233 |
| 2009/0080545 A1* | 3/2009 | Nicolas | ............... | 375/260 |
| 2009/0094470 A1 | 4/2009 | Gao et al. | | |
| 2009/0213275 A1 | 8/2009 | Trager | | |
| 2009/0225822 A1* | 9/2009 | Tupala et al. | ............... | 375/226 |
| 2010/0124292 A1* | 5/2010 | Rajagopal | ............... | 375/260 |
| 2010/0130153 A1 | 5/2010 | Poorfard et al. | | |
| 2010/0309384 A1* | 12/2010 | Asjadi | ............... | 348/725 |
| 2010/0310022 A1* | 12/2010 | Asjadi | ............... | 375/343 |
| 2010/0328536 A1 | 12/2010 | Hendrickson et al. | | |
| 2010/0328544 A1 | 12/2010 | Hendrickson et al. | | |
| 2011/0019101 A1* | 1/2011 | Goto et al. | ............... | 348/725 |
| 2011/0019782 A1* | 1/2011 | Kobayashi et al. | ............... | 375/344 |
| 2011/0037904 A1* | 2/2011 | Yokokawa et al. | ............... | 348/725 |
| 2011/0099445 A1* | 4/2011 | Goto et al. | ............... | 714/746 |
| 2011/0164671 A1* | 7/2011 | Matsumura | ............... | 375/229 |
| 2011/0280327 A1* | 11/2011 | Ko et al. | ............... | 375/260 |

OTHER PUBLICATIONS

Digital Video Broadcasting (DVB); Implementation guidelines for a second generation digital terrestrial television broadcasting system (DVB-T2), DVB Document A133 Jun. 2010.*

"Digital Video Broadcasting (DVB); Implementation guidelines for a second generation digital terrestrial television broadcasting system (DVB-T2)", DVB Document A 133 Jun. 2010.*

U.S. Appl. No. 12/751,076, entitled "Techniques to Control Power Consumption in an Interactive Decoder by Control of Node Configurations," filed Mar. 31, 2010 by David Rault, et al.

U.S. Appl. No. 12/751,052, entitled "Reducing Power Consumption in an Interactive Decoder," filed Mar. 31, 2010 by David Rault, et al.

U.S. Appl. No. 12/751,022, entitled "Multi-Standard Digital Demodulator for TV Signals Broadcast Over Cable, Satellite and Terrestrial Networks," filed Mar. 31, 2010 by Pascal Blouin, et al.

U.S. Appl. No. 12/551,146, entitled "Digital Phase Lock Loop Configurable as a Frequency Estimator," filed Aug. 31, 2009 by Li Gao.

Ahmad Darabiha, "Power Reduction Techniques for LDPC Decoders," pp. 1-10.

ETSI, Draft ETSI EN 302 307, "Digital Video Broadcasting (DVB); Second generation framing structure, channel coding and modulation systems for Broadcasting, Interactive Services, News Gathering and other broadband satellite applications," V1.1.1, 2004-2006, pp. 1-74.

Micronas, "DRX 3960A Digital Receiver Front-End," Feb. 8, 2001, pp. 1-30.

NXP, "TDA 8295 Digital Global Standard Low IF Demodulator for Analog TV and FM Radio," Feb. 4, 2008, pp. 1-77.

Xceive, "Welcome to Xceive at CES 2007, Upgrade Your Tuner! Get XC5000," 2007, pp. 1-28.

Xceive, "XC5000 Product Brief," Dec. 2006, pp. 1-2.

\* cited by examiner

MEMORY-AIDED SYNCHRONIZATION IN A RECEIVER

BACKGROUND

Today, more and more television broadcasters are moving from analog broadcasting systems to digital broadcasting systems. Various standards are present for digital video broadcasting, where signals may be received by a selected one of various sources such as cable, satellite, and terrestrial. One available set of standards is referred to as the digital video broadcasting (DVB) standards.

For terrestrial DVB communications, a channel is broadcast as a data stream having a series of data frames. To allow a receiver to lock onto a desired channel, a synchronization process is performed to enable a demodulator of the receiver to lock onto the signal stream.

Currently, this synchronization process is complicated and time consuming. This is so, as preamble symbols of a data frame must first be decoded to obtain information needed for further steps in the synchronization process. However, even when some of the preamble information can be obtained and decoded from a first frame, additional information such as knowledge of an operative guard interval is not known. Furthermore, an understanding of a pattern of pilot carriers included in the data stream is also not known. Without this information, it becomes difficult or impossible to finalize synchronization for multiple data frames. Also in DVB-T2 systems, the delay for decoding a first preamble symbol makes it also impossible to decode following symbols (additional preamble P2 or data symbols) on the fly. This processing thus delays the end of the synchronization process, requiring additional time before valid channel information can be obtained.

SUMMARY OF THE INVENTION

One aspect of the present invention is directed to method that can be used to efficiently synchronize a demodulator to an incoming data stream. In general, the method may provide for replaying of at least some information, namely one or more preamble and data symbols of a frame, to more rapidly perform synchronization.

In one embodiment, the method may include storing information from a first frame of an incoming broadcast signal in a memory coupled to a demodulator, decoding a first preamble symbol of the first frame to determine a mode of a fast Fourier transform (FFT) engine of the demodulator, accessing at least some of the stored information from the memory and decoding at least one second preamble symbol of the first frame from the accessed information to determine pilot pattern information, and receiving data symbols of the first frame and synchronizing the demodulator based on the received data samples and the pilot pattern information. In this way, the demodulation can occur more rapidly, enabling the output of desired decoded data, e.g., in the form of a video broadcast to a display of a system.

Other embodiments are directed to an apparatus that can perform this synchronization. In one embodiment, a demodulator may include or may be coupled to a memory that can be used to store the data for replay use as discussed above. In one embodiment, an apparatus which may be a part of broadcast or other receiver may include the demodulator and associated memory.

More specifically, in one embodiment, the apparatus may include an analog-to-digital converter (ADC) to receive incoming broadcast information and to digitize the information, a demodulator coupled to the ADC to receive and demodulate the digitized information, and a memory coupled to the demodulator to store data from the demodulator corresponding to at least a first preamble symbol and one or more second preamble symbols of a frame of the incoming broadcast information. In addition, the apparatus may further include synchronization logic to selectively control the memory to provide the stored data to the demodulator during a synchronization operation. This logic may cause the memory to selectively provide the stored data to the demodulator during a guard interval detection, in which the second preamble symbol(s) (replayed from the memory) can be iteratively decoded with different guard intervals until a correct guard interval is determined. In various embodiments, the memory input and output may be at a single node of the signal processing path (and where this location can vary in different embodiments). To this end, some embodiments may include a multiplexer that can be controlled to pass either live stream data or re-played preamble and data symbols for processing during a synchronization operation.

DETAILED DESCRIPTION

Embodiments may provide a memory that can be associated with a demodulator to aid in synchronization operations. That is, embodiments may provide a memory, which can be a standalone memory or a shared memory, for use in a synchronization process. To this end, the memory may store at least portions of an initial frame of an incoming data stream, e.g., at least the preamble portions, to enable their replay during synchronization to thus complete synchronization and lock the demodulator onto the incoming data stream in a more efficient manner. While embodiments described herein are used in connection with a terrestrial DVB-T2 implementation, it is to be understood that the scope of the present invention is not limited in this regard, and embodiments may be used in various communication systems, particularly where an encoding is according to an orthogonal frequency division multiplexing (OFDM) scheme.

Figure 1:
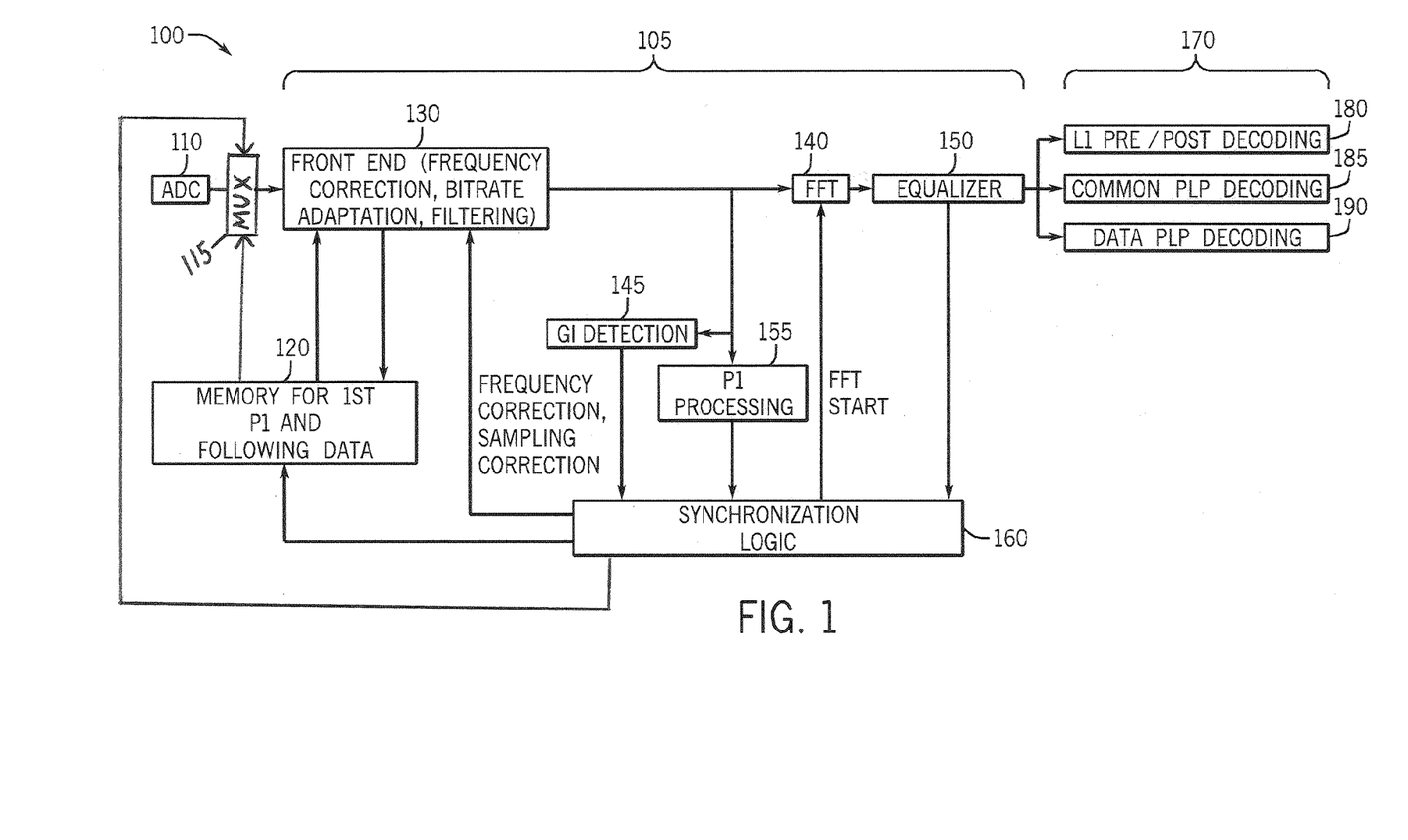
FIG. 1 is a block diagram of a portion of a receiver in accordance with an embodiment of the present invention.

Referring now to FIG. 1, shown is a block diagram of a portion of a receiver in accordance with an embodiment of the present invention. As shown in FIG. 1, receiver 100 may be configured to receive incoming digitized information from a received media stream, e.g., a digital video broadcast in accordance with a given DVB specification. In general, receiver 100 may include a demodulator 105 and a decoder 170. In one embodiment, the portion of system 100 shown in FIG. 1 may be implemented on a single semiconductor die, although the scope of the present invention is not limited in this regard.

Incoming information as processed by an analog front end of a receiver (not shown for ease of illustration in FIG. 1) may be provided to an analog-to-digital converter (ADC) 110 which converts the analog information into a digital form at a selected sample rate. As seen, the output from ADC 110 may be provided to a front end circuit 130, which as will be discussed further below, may perform various processing on the incoming stream data.

As further seen, front end 130 may be coupled to a memory 120. The information stored in memory 120 with regard to the incoming digitized broadcast stream may be for the initial portions of a data frame, e.g., one or more preamble symbols and at least one or more data symbols. This information may be used, as discussed further below, to perform a more rapid synchronization of the receiver to the incoming data stream such that requested media content can be more rapidly decoded and provided to a user. In an embodiment used for a DVB-T2 synchronization, memory 120 may be controlled to store data beginning at the initialization of a synchronization process and until at least a minimum of Ts milliseconds (ms) after the detection of a first P1 preamble symbol, where Ts is the symbol duration of one 32K symbol having a guard interval of $19/128$. However in various embodiments, the data that is stored in memory 120 may be much longer than Ts milliseconds. In various embodiments, memory 120 may be an on-chip (or external) storage such as static random access memory (SRAM), although other storage implementations are possible in different embodiments. Note that memory 120 may be dedicated for this synchronization operation, or may be shared or re-used with other portions of a receiver. For example, the memory may be reused for other receiver operations such as for deinterleaving or error correction (or MPEG decoding in case of a single SoC for demodulation and video decoding).

As further seen in FIG. 1, demodulator 105 may generally include a signal processing path that has a front end circuit 130 coupled to receive the incoming data stream. In various embodiments, front end circuit 130 may perform various operations including frequency correction, bit rate adaptation, sampling correction, filtering, and so forth. Thus as seen, synchronization logic 160 may provide a frequency correction signal and a sampling correction signal to front end circuit 130 for controlling these operations.

The filtered data output by front end circuit 130 may be provided to a fast Fourier transform (FFT) engine 140 of the signal processing path to perform a FFT operation on the incoming data. The resulting FFT output is provided to an equalizer 150 that can perform equalization operations such as filtering and other signal conditioning to thus account for variations in the received data and/or link from which the data is received. In turn, the resulting equalized data may be provided to a decoder circuit 170. As seen in the embodiment of FIG. 1, different decoding signal processors may be present, including a L1 pre-/post decoder circuit 180, a common physical layer pipe (PLP) decoder circuit 185, and a data PLP circuit 190.

As further seen in FIG. 1, to perform decoding on certain preamble information, as well as to detect a guard interval (GI) of the received incoming media stream, demodulator 105 may further include a guard interval detection circuit 145 and a P1 processor 155. In various embodiments, GI detection circuit 145 may perform a detection of a guard interval, based on a temporal correlation on the data stream. In turn, P1 processor 155 may detect and decode information present in a first preamble symbol. As will be discussed further below, this first preamble symbol (P1) may include information regarding a transmission mode of following preamble data. While shown with this particular implementation in the embodiment of FIG. 1, understand the scope of the present invention is not limited in this regard.

For example, while memory 120 is shown configured to receive data from the front end circuit 130, in other implementations, the data to be stored in memory 120 can be obtained from any point in the signal processing path between the ADC 110 and FFT engine 140. Thus in various embodiments, a multiplexer 115, which may be under control of a synchronization logic 160, may be present. This multiplexer can, in one embodiment, be configured between the ADC and the front end circuit and may be coupled to provide either the live stream from ADC 110 received at a first input of the multiplexer or stored information from memory 120 received at a second input of the multiplexer. Or the multiplexer can be configured between the front end circuit and the FFT engine to pass live or stored data to the FFT engine. In some embodiments, certain processing such as frequency correction, bit rate adaptation or so forth can be performed on the memory output. Thus in various embodiments, memory 120 can have its input and output at the same point in the signal processing path of the demodulator, and this point can be in different locations in different implementations.

Further details regarding a synchronization process in accordance with an embodiment of the present invention are described for an implementation used in a television receiver, namely a receiver that can receive and process incoming signals according to a digital video broadcasting terrestrial standard, e.g., the DVB-T2 specification. Although described for this particular specification, the scope of the present invention is not limited in this regard, and embodiments can be used to synchronize receivers for various incoming data streams, particularly where the data streams are encoded using orthogonal frequency division multiplexing (OFDM).

Figure 2:
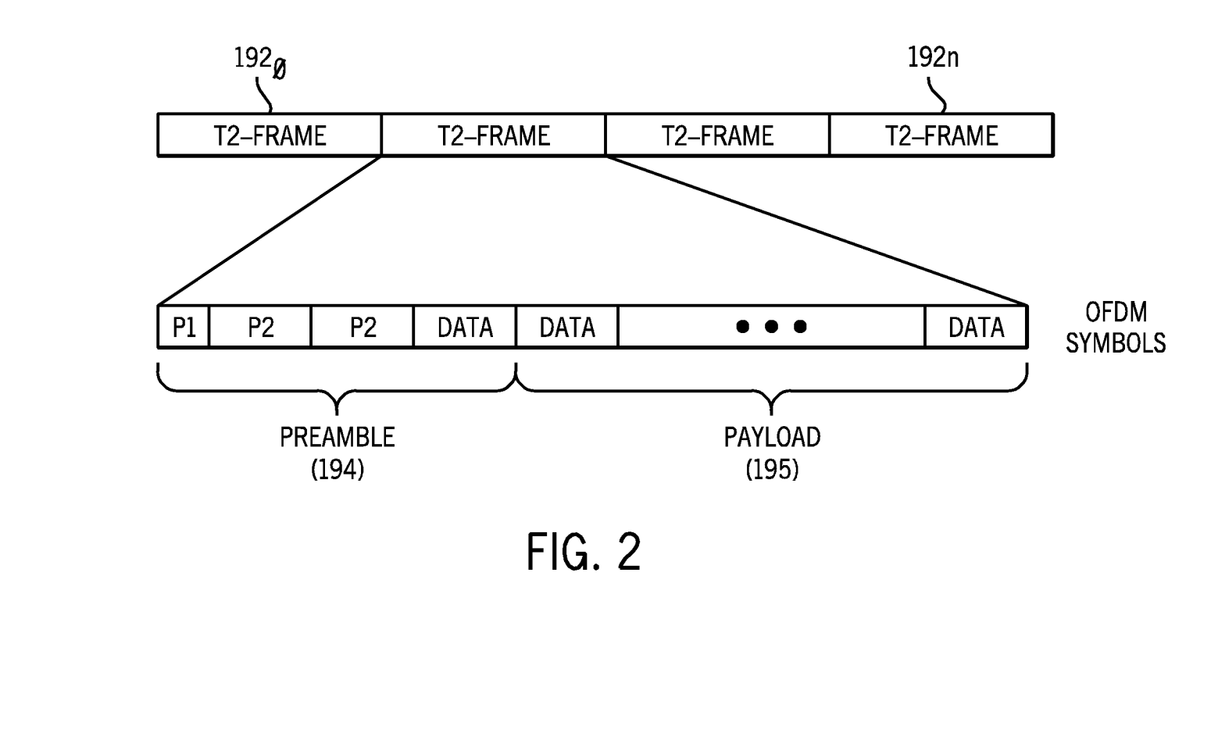
FIG. 2 is a block diagram of a series of frames according to the DVB-T2 specification.

Referring now to FIG. 2, shown is a block diagram of a series of frames according to the DVB-T2 specification. As seen in FIG. 2, a plurality of so-called T2 frames $192_0$-$192_n$, are present. A typical DVB-T2 broadcast channel transmits a data stream including a series of such T2-frames. Each frame 192 may be a series of OFDM symbols having a maximum width of 250 ms. As further seen in FIG. 2, each T2 frame 192 includes various information, including a preamble portion 194 and a payload portion 195. As seen, preamble portion 194 includes a first preamble symbol P1 and one or more additional preamble symbols P2. The modulation of preamble symbol P1 is known and can be used to easily detect the beginning of a T2 frame. By decoding preamble symbol P1, certain information (e.g., FFT mode and SISO/MISO and group of potential GI) useful for decoding information present in the remaining portion of the frame can be obtained.

The presence of one or more P2 preamble symbols depends on the FFT mode. Such P2 preamble symbols may carry L1 signaling information. However, the modulation of these P2 preamble symbols is not predefined. Thus although the FFT mode can be decoded from the P1 symbol, the guard interval cannot be determined in this way. Following preamble portion 194 is a payload portion 195 that includes a plurality of data symbols. These data symbols may be modulated with the same FFT mode and guard interval as present in the P2 preamble symbol(s). These data symbols may include pilot carriers that are used for synchronization and channel estimation. The pilot positions depend on pilot pattern information that is present within the L1 signaling information of the P2 preamble symbol.

When trying to lock onto a desired channel, in general it is not possible to complete synchronization in one or even two frames since as discussed above the initial P2 preamble symbols that follow the first detected P1 preamble symbol are difficult to decode, as the GI is not known and frequency and sampling recovery portions of synchronization have not been completed. Furthermore, without knowledge of the GI and pilot pattern information, synchronization of the data symbols is also not possible.

To avoid difficult and time consuming GI detection and coarse estimations that delay decoding and synchronization completion for one or more T2 frames, embodiments can use the initial preambles that are stored in memory to thus replay the information present to enable a more efficient and latency-reduced synchronization process.

Figure 3:
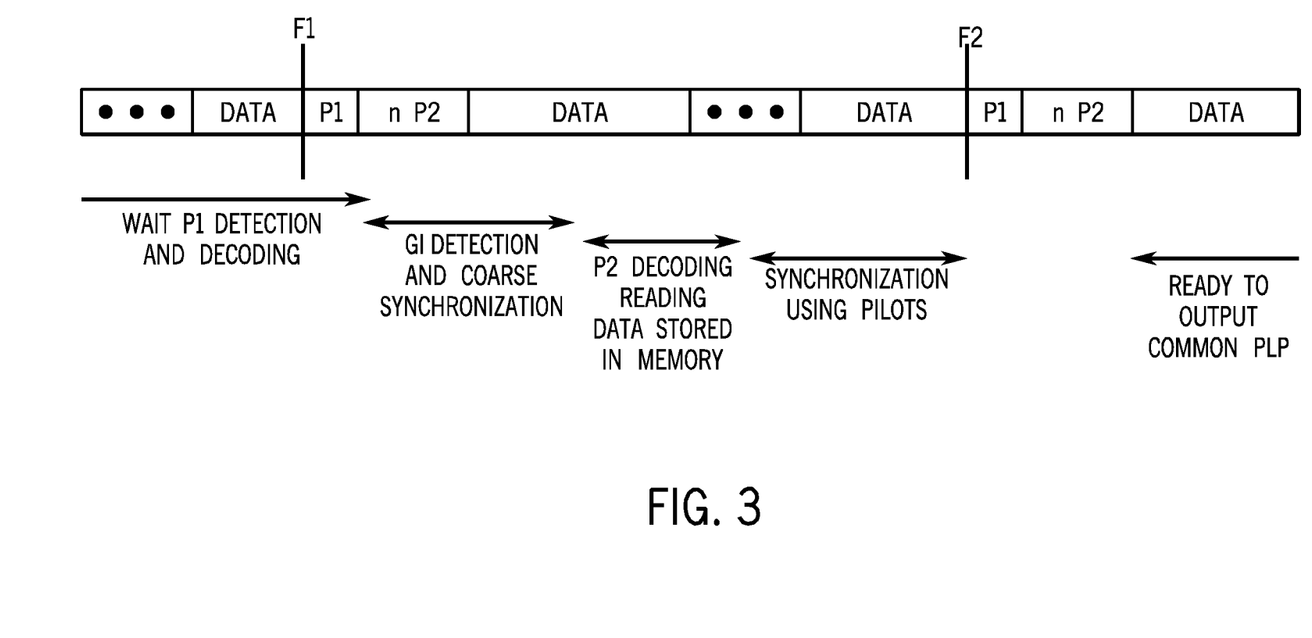
FIG. 3 is an illustration of multiple incoming frames that can be received and processed in a receiver in accordance with one embodiment of the present invention.

To understand at a high level how synchronization in accordance with an embodiment of the present invention can be performed, it is instructive to analyze a time course of events performed in a synchronization process according to an embodiment. As shown in FIG. 3, multiple incoming frames that can be received and processed in a receiver are present. Specifically, a first frame F1 begins upon receipt of a first P1 preamble symbol, and a second frame F2 begins upon receipt of a second P1 preamble symbol. As seen, the sequence of synchronization in accordance with an embodiment of the present invention may begin by receiving this first P1 preamble symbol of frame F1 and decoding the information present in this preamble symbol. At the same time (although not shown in FIG. 3) this first P1 preamble symbol and the following P2 preamble symbols and one or more data symbols may be stored in a memory of the demodulator. Then using that stored information of the P2 symbol(s), a guard interval detection and coarse synchronization may be performed. Note that in some implementations the guard interval detection and coarse synchronization can be performed directly on the live stream itself instead of using the one or more P2 symbols stored in memory.

After such GI detection and coarse synchronization, decoding of the information present in the P2 preamble symbol(s) can be performed by replaying the one or more P2 preamble symbols stored in the memory. Thereafter, synchronization may be completed by synchronizing on the data symbols of the live stream using the pilots present in the data symbols. Accordingly, at the beginning of the data symbols of the next frame F2, synchronization has already been completed such that valid data symbols can be demodulated and output to a selected decoder. In fact, in some situations synchronization may be completed prior to completion of receipt of the first frame F1. In contrast, it could be one or more additional frames before a conventional synchronization process could be completed.

Figure 4:
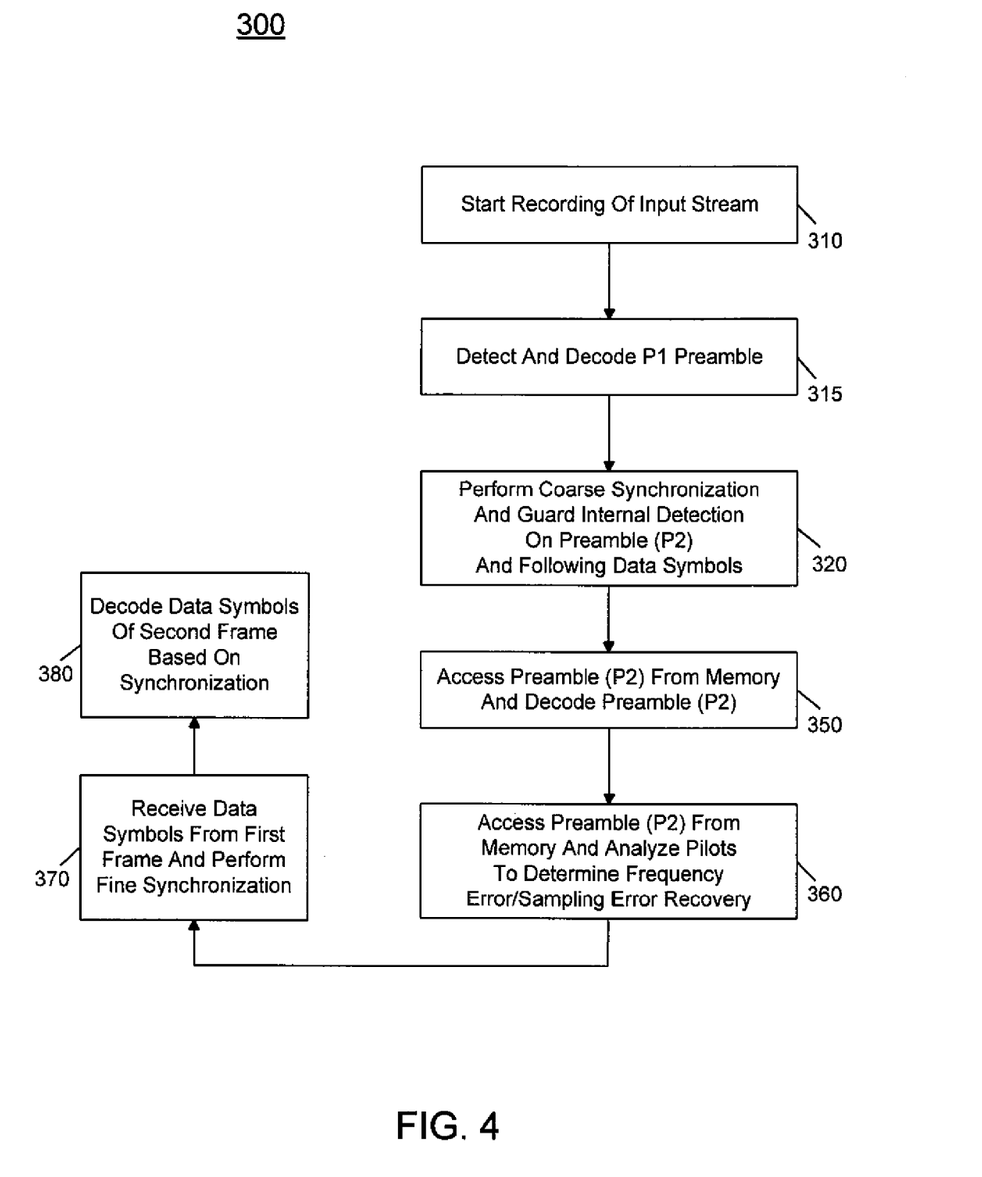
FIG. 4 is a flow diagram of a method for synchronizing a receiver in accordance with an embodiment of the present invention

As discussed above, in different implementations synchronization can use differing combinations of live stream data and data stored in a memory. Referring now to FIG. 4, shown is a flow diagram of a method in accordance with one embodiment of the present invention. More specifically, method 300 shown in FIG. 4 may be used to perform a synchronization in which the guard interval and coarse synchronization is performed on live stream data. As seen in FIG. 4, method 300, which may be implemented by a combination of logic present in a synchronization logic of a receiver, a memory and various components of a signal processing path of a demodulator, can begin by receiving and storing information from a first frame. That is, recording of the input stream may begin (block 310). As discussed above, at least the preamble symbols and one or more data symbols of a first received frame can be stored in a memory accessible to the demodulator.

In parallel with the recording, control passes to block 315 where the first preamble symbol P1 can be detected and then decoded. More specifically as discussed above this preamble symbol may include information regarding a given FFT mode. Nevertheless, from this symbol the guard interval and additional information used for synchronization cannot be determined. Accordingly, control passes to block 320 where a coarse synchronization as well as a guard interval detection may be performed using one or more additional preamble and data symbols. As one example, this guard interval detection may be according to a correlation method, e.g., implemented in GI detector 145 of FIG. 1.

On successful GI detection, control passes to block 350. There, the one or more P2 preamble symbols may be accessed from the memory and used to decode the information present in the preamble symbol(s). That is, because at this time the guard interval has been determined, and coarse synchronization is done, successful decoding of the P2 preamble symbol(s) can occur. The decoding of the P2 preamble symbol(s) may provide information such as present in the L1 pre-signaling data that may include the identification of the actual guard interval used, pilot pattern information and so forth.

Thus at this time, the receiver is sufficiently coarsely synchronized. However, to finely synchronize the receiver, the preamble information stored in the memory can be accessed an additional one or more times to perform further frequency error/sampling error recovery (block 360). This is so, as the P2 preamble symbols may include a high density of pilot information. That is, for example, in the DVB-T2 specification, a pilot carrier may be present for every 3 data carriers, while in contrast for data symbols a pilot carrier is only present for every 12 data carriers in best case. Accordingly, by replaying the preamble information accessed from the memory one or more times, these high-density pilots can be analyzed to more efficiently determine frequency error/sampling error recovery. Note that the replaying of preamble symbols stored in the memory can be performed at the same rate at which the data symbols are received, although the scope of the present invention is not limited in this regard. That is, in other implementations the reading of the data symbols from memory can be at a higher rate, thus potentially realizing a more efficient and lower latency synchronization process.

Still referring to FIG. 4, control then passes to block 370, where live stream data from the initial frame can be received and using these data symbols and the pilot carriers in the data symbols, fine synchronization may be completed (block 370). Accordingly, at this time synchronization of the receiver is complete, and accordingly control passes to block 380 where data symbols of a following frame (e.g., a second frame) can be decoded based on the synchronization that has been determined and the PLP bandwidth allocation indicated in the P2 symbols of this second frame.

While the embodiment of FIG. 4 refers to the presence of a first frame and a second frame and where all synchronization operations are performed using the first frame data such that valid data decoding can be performed beginning in the second frame, understand the scope of the present invention is not limited in this manner. In some implementations complete synchronization may be performed within the first frame such that data symbols of the end of the first frame can also be validly decoded. This can be realized by decoding live stream data symbols of the first frame. Furthermore, it is possible that in certain systems the synchronization may take longer than a single frame. Yet using stored preamble symbols in accordance with an embodiment of the present invention, a full synchronization can be performed with reduced latency as compared to a conventional synchronization.

Figure 5:
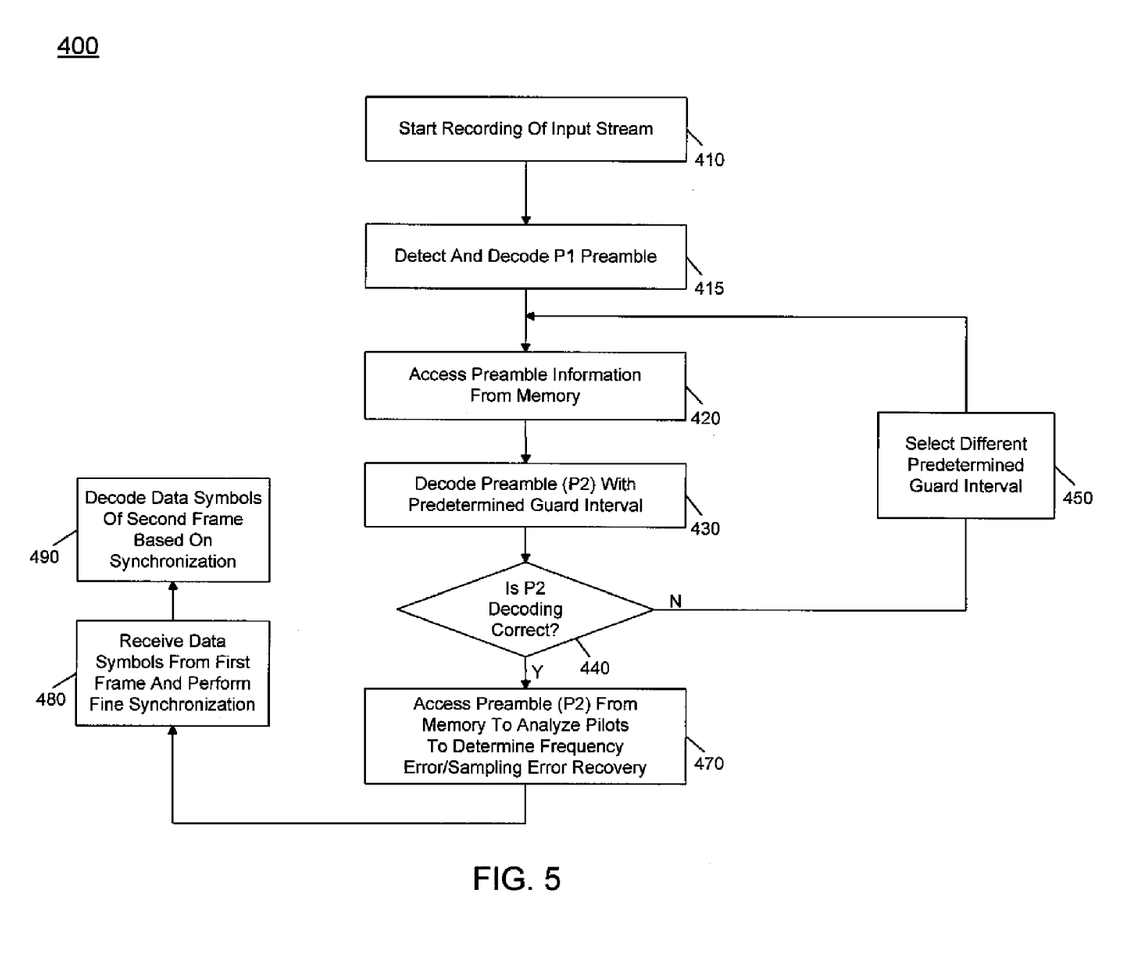
FIG. 5 is a flow diagram of a method for synchronizing a receiver in accordance with another embodiment of the present invention.

In addition to the embodiment of FIG. 4, synchronization can be performed in which the guard interval detection is realized using replayed data from the memory. That is, in other implementations, instead of determining the guard interval using live stream data, guard interval detection can be performed based on replayed P2 preamble symbol data. Referring now to FIG. 5, shown is a flow diagram of a method for synchronizing a receiver in accordance with another embodiment of the present invention. As shown in FIG. 5, method 400 may similarly be performed by a combination of synchronization logic and various demodulator components, in addition to a memory accessible to the demodulator. Blocks 410 and 415 of method 400 may be implemented as discussed above with regard to blocks 310 and 315 of FIG. 4, namely the information of a frame is received and stored, and the P1 preamble symbol can be decoded from the live stream data.

At block 420, preamble information may be accessed from memory. That is, P2 symbol data can be replayed from the memory and the P2 preamble symbol can be decoded using a predetermined or arbitrarily selected guard interval (block 430). That is, in the embodiment of FIG. 5, a successive decoding of the preamble symbol can be performed, each with a different predetermined guard interval until the correct guard interval is found. For example, assume on a first iteration the P2 symbol(s) is replayed from memory and decoding is attempted with a guard interval of 1/32. If this predetermined guard interval of 1/32 is the correct guard interval (or is close to the correct guard interval), it is possible to decode the L1-pre-signaling data present in the P2 preamble symbol. Control passes next to diamond 440, where it may be determined whether the P2 decoding is correct. As an example, the confirmation as to whether the P2 decoding is correct can be by analyzing a cyclic redundancy checksum (CRC) of the decoded P2 preamble symbol. Furthermore, assuming that the CRC is correct, the GI can be extracted from the L1 pre-signaling data of the preamble symbol itself.

If at diamond 440 it is determined that the P2 decoding is not correct, control passes to block 450, where a different predetermined guard interval may be selected. For example, a next guard interval of 1/16 may be used or so forth. In various embodiments, a table may be stored, e.g., within synchronization logic, to identify a set of predetermined guard intervals that may be possible in a given broadcast specification. Note that in DVB-T2 in case of 8K or 32K FFT, the P1 preamble may include an indication of the GI subset that is used. As seen in FIG. 5, after selecting a different guard interval, control passes back to block 420, discussed above.

If instead it is determined that the guard interval that was used is correct, control passes to block 470, where the preamble symbol P2 again may be accessed from memory and used to exploit pilot carriers to process timing/frequency error recovery. In addition, similar to the flow of blocks 370 and 380 of FIG. 4, various operations to finalize synchronization and then begin decoding of valid data symbols may be performed in blocks 480 and 490, respectively.

Figure 6:
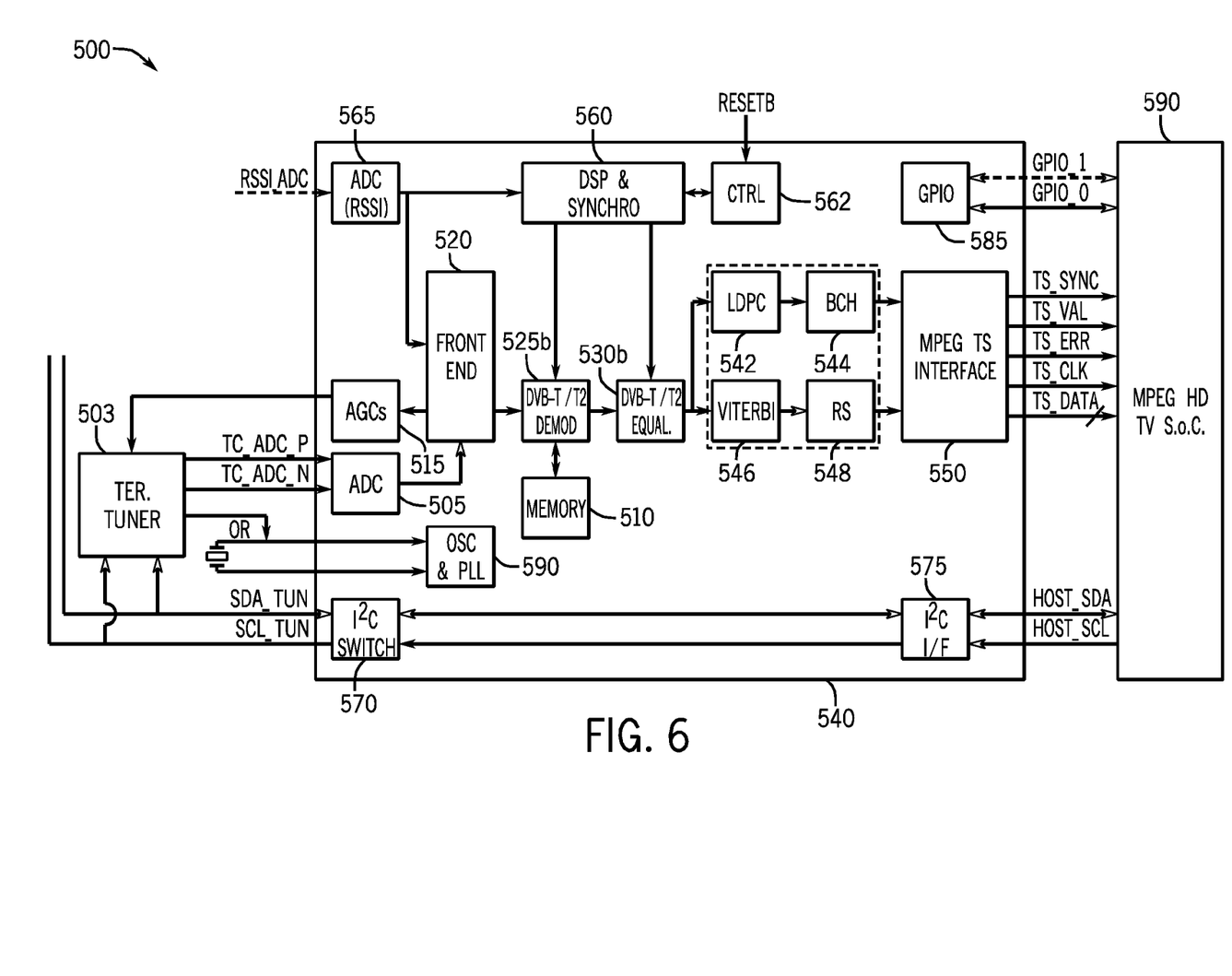
FIG. 6 is a block diagram of a demodulator in accordance with an embodiment of the present invention in a system.

Referring now to FIG. 6, shown are further details of incorporation of a demodulator in accordance with an embodiment of the present invention in a system. Specifically, FIG. 6 shows a system 500 that further includes a system-on-a-chip (SoC) 590 that may be coupled to receive an output transport stream from a demodulator 540. Such SoC may be used to perform MPEG decoding to thus generate audio and video signals to be output to a display of system 500 (not shown in FIG. 6).

FIG. 6 further shows the general signal processing path for the incoming signals. Specifically as seen in FIG. 6, incoming signals received by a tuner 503 may be provided through an ADC 505 to a front end 520. Front end 520 may perform various signal processing on incoming signals, which may be at a given IF, to filter and downconvert them to baseband signals.

The incoming signals from front end 520 are provided to a demodulator circuit 525 which, along with DSP/synchronizer 560, may perform synchronization in accordance with an embodiment of the present invention using memory 510. The demodulated signals may then be provided to an equalizer 530 and onto a decoder circuit. More specifically, the equalized signals may be decoded using a LDPC decoder 542 and a BCH decoder 544 for DVB-T2 signals, while a Viterbi decoder 546 and a Reed-Solomon decoder 548 can be used for DVB-T signals. Note that the circuitry of the signal processing path may be dedicated hardware in some embodiments.

The decoded transport stream from the decoder circuit may be provided to a MPEG transport stream interface 550 that in turn outputs various transport stream information to SoC 590. The transport stream interface may be programmable to provide a flexible range of output modes and is fully compatible with any MPEG decoder or conditional access modules to support any back-end decoding chip.

Various other circuitry may be present within demodulator 540, including, for example, a RSSI ADC 565, and automatic gain control circuitry 515 which may, based on signal strength information, send various control signals to control gain elements of tuner 503. A control interface 562 may receive an incoming reset signal and is in communication with DSP/synchronizer 560. In addition, various general-purpose IO signals may be communicated via a general-purpose IO interface 585. $I^2C$ communication may be via an $I^2C$ switch 570 and an $I^2C$ interface 575. Various control and clock signals needed may be generated using an oscillator/phase lock loop 590 which may be coupled to, e.g., an off-chip crystal or other clock source. While shown with this particular implementation in the embodiment of FIG. 6, the scope of the present invention is not limited in this regard.

Figure 7:
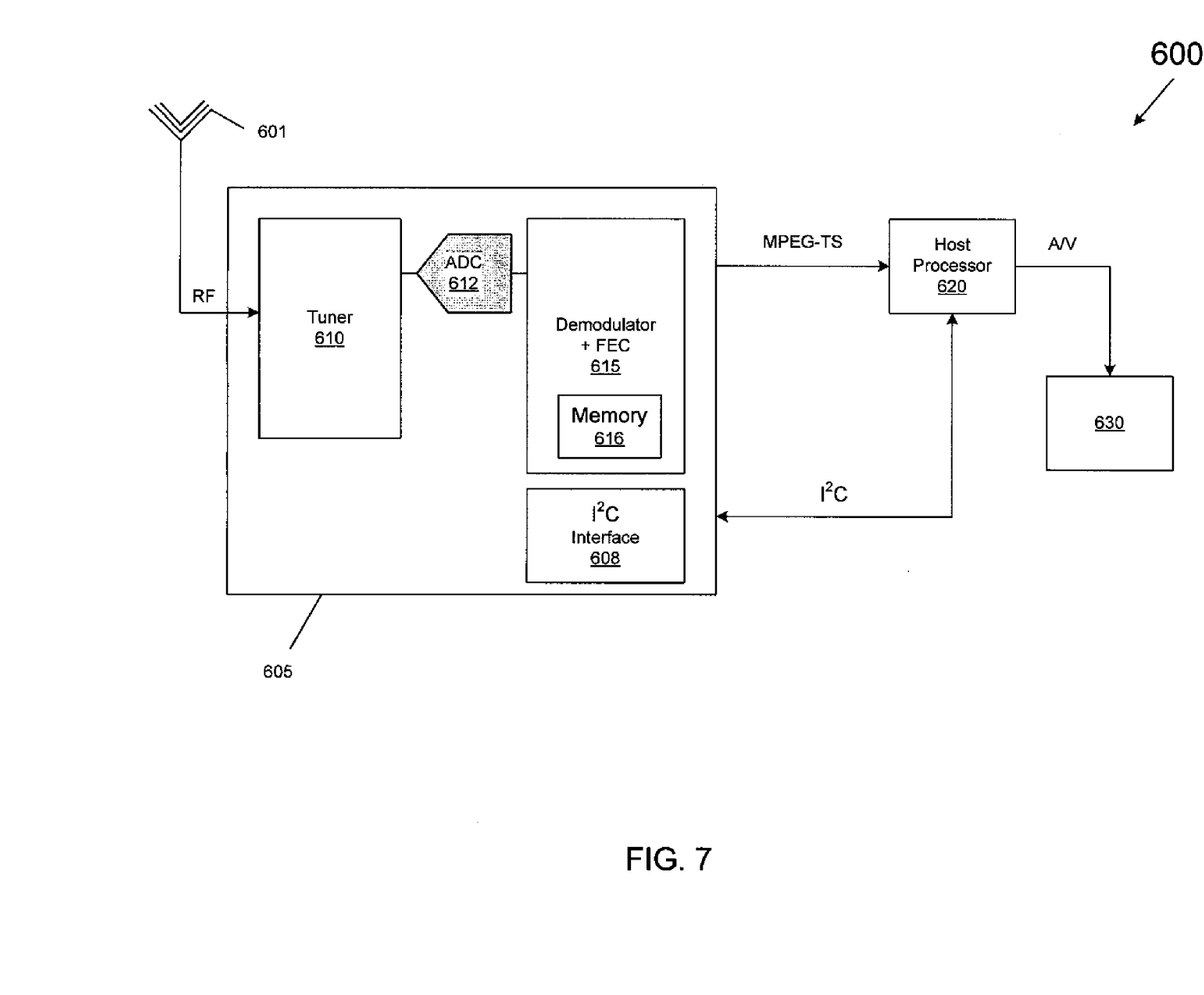
FIG. 7 is a block diagram of a system in accordance with one embodiment of the present invention.

Embodiments may be implemented in many different system types, such as set-top boxes, high definition or standard digital terrestrial televisions, and so forth. Some applications may be implemented in a mixed signal circuit that includes both analog and digital circuitry. Referring now to FIG. 7, shown is a block diagram of a system in accordance with one embodiment of the present invention. As shown in FIG. 7, system 600 may include a television that is coupled to receive a RF signal from an antenna source 601 such as an over-the-air antenna. However, in other embodiments, the original source may be cable distribution, satellite, or other source that is then redistributed through a digital terrestrial network. The incoming RF signal may be provided to a front end device 605 which may be, in one embodiment a single-chip mixed signal device.

Referring still to FIG. 7, front end device 605 may include a tuner 610 and a demodulator 615 that may include FEC circuitry. More specifically, the incoming RF signal is provided to a tuner 610 for tuning to a desired signal channel. While the scope of the present invention is not limited in this regard, tuner 610 may include various circuitry. For example, in one embodiment tuner 610 may include a bandpass filter having an output coupled to a low noise amplifier (LNA) to receive and amplify the RF signal. The output of the LNA may be provided to another bandpass that in turn is coupled to a mixer. In turn, the mixer downconverts the incoming RF signal to an IF output, which may be digitized by an analog-to-digital converter (ADC) 612, to provide a desired signal channel.

Referring still to FIG. 7, the digitized output of ADC 612 may be provided to additional processing circuitry including demodulator 615 which may be the demodulator circuitry shown in FIG. 1. As further seen, demodulator 615 includes a memory 616 that can be controlled to store and provide preamble information from a first frame of an incoming broadcast, as described above.

The output of demodulator 615 may correspond to a transport stream such as an MPEG-TS that is provided to a host processor 620 for further processing into an audio visual signal that may be provided to a display 630, such as a computer monitor, flat panel display or other such display. Note further, a control channel which may be in accordance with an I²C communication path may be present between host processor 620 and front end device 605. Accordingly, front end device 605 may include an I²C interface 608 to enable communication along this path.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    storing a first preamble symbol and at least one second preamble symbol of a first frame of an incoming broadcast signal in a memory coupled to a demodulator, wherein an output of the demodulator is coupled to an input of a decoder circuit;
    detecting a guard interval based on a temporal correlation on live stream data;
    decoding the first preamble symbol of the first frame using the live stream data of the first frame during synchronization of the demodulator;
    accessing the stored at least one second preamble symbol of the first frame from the memory via a synchronization logic of the demodulator and replaying the stored at least one second preamble symbol at least a first time to decode the at least one second preamble symbol to determine transmission parameters of the incoming broadcast signal;
    determining a guard interval from the at least one second preamble symbol,
        wherein the determining a guard interval includes:
            decoding the at least one second preamble symbol with a predetermined guard interval; and
            determining if the predetermined guard interval is correct, including analyzing a checksum of the decoded at least one second preamble symbol, and if the checksum is correct, extracting a guard interval of signaling information in the decoded at least one second preamble symbol, and if not correct, iteratively performing the decoding and determining with different predetermined guard intervals until the predetermined guard interval is correct; and
    receiving data symbols of the first frame using the live stream data and synchronizing the demodulator based on the received live stream data symbols of the first frame and the determined guard interval from the at least one second preamble symbol.

2. The method of claim 1, further comprising detecting and decoding the first preamble symbol to determine a mode of a fast Fourier transform (FFT) engine of the demodulator.

3. The method of claim 1, wherein the data symbols include pilot carriers positioned according to pilot pattern information present in the determined transmission parameters.

4. The method of claim 1, further comprising accessing the at least one second preamble symbol from the memory for each iteration.

5. The method of claim 1, further comprising replaying the stored at least one second preamble symbol at least a second time, including accessing the stored at least one second preamble symbol from the memory for a plurality of iterations to update at least one of a frequency error and a sampling error using pilot information of the stored at least one second preamble symbol.

6. An apparatus comprising:
    an analog-to-digital converter (ADC) to receive incoming broadcast information and to digitize the incoming broadcast information;
    a demodulator coupled to the ADC to receive the digitized incoming broadcast information and to demodulate the digitized incoming broadcast information;
    a memory coupled to the demodulator to store data from the demodulator corresponding to at least a first preamble symbol and one or more second preamble symbols of a frame of the incoming broadcast information; and
    synchronization logic of the demodulator to selectively control the memory to provide at least some of the stored data to the demodulator to enable the demodulator to replay the one or more second preamble symbols from the memory during a synchronization operation,
        wherein the synchronization logic is to cause the memory to selectively provide the at least some stored data to the demodulator during a guard interval detection, and
        to iteratively decode the one or more second preamble symbols received from the memory with a plurality of predetermined guard intervals until a correct guard interval is determined, the correct guard interval determined by analyzing a checksum of the decoded one or more second preamble symbols, and if valid, to extract a guard interval of signaling information in the at least one decoded second preamble symbol.

7. The apparatus of claim 6, wherein the synchronization logic includes a storage to store the plurality of predetermined guard intervals, each corresponding to a valid guard interval for a digital video broadcast (DVB) specification.

8. The apparatus of claim 6, wherein the synchronization logic is to determine if the predetermined guard interval matches a guard interval of signaling information in the decoded one or more second preamble symbols.

9. The apparatus of claim 6, further comprising a multiplexer having a first input coupled to the ADC and having a second input coupled to the memory, and to selectively provide one of the first input and the second input to the demodulator, and wherein after the guard interval detection, the synchronization logic is to cause the multiplexer to selectively provide the second input to the demodulator for a plurality of iterations to decode the one or more second preamble symbols.

10. The apparatus of claim 9, wherein the synchronization logic is to complete synchronization using data symbols of the frame.

11. The apparatus of claim 10, wherein the synchronization completion includes accessing the one or more second preamble symbols from the memory for a plurality of iterations to update at least one of a frequency error and a sampling error using pilot information of the one or more second preamble symbols.

12. The apparatus of claim 6, wherein the synchronization logic is to cause the first preamble symbol and the one or more second preamble symbols to be stored into the memory.

13. The apparatus of claim 12, wherein the memory is to further store information for deinterleaving.

14. The apparatus of claim 6, further comprising a multiplexer having a first input coupled to a front end of the demodulator and having a second input coupled to the memory, and to selectively provide one of the first input and the second input to a fast Fourier transform (FFT) engine of the demodulator.

15. A system comprising:
a tuner to receive a broadcast signal and to downconvert the broadcast signal to a second frequency signal;
an analog-to-digital converter (ADC) coupled to an output of the tuner to convert the second frequency signal to a digital signal;
a demodulator coupled to an output of the ADC to receive the digital signal and to demodulate the digital signal, the demodulator including a front end portion, and a fast Fourier transform (FFT) engine to receive an output of the front end portion;
a memory directly coupled to the front end portion of the demodulator to store the digital signal corresponding to at least a first preamble symbol and at least one second preamble symbol of live stream data of a frame of the broadcast signal; and
synchronization logic directly coupled to the front end portion, the FFT engine, and the memory, to selectively control the memory to provide the at least one second preamble symbol to the demodulator during a synchronization operation, wherein in a first mode the demodulator is to use a guard interval of signaling information obtained from the at least one second preamble symbol of the live stream data to decode the at least one second preamble symbol to obtain pilot pattern information and to thereafter replay the at least one second preamble symbol received from the memory to determine frequency error and/or sampling error recovery, and
in a second mode the synchronization logic is to iteratively decode the at least one second preamble symbol replayed from the memory with a plurality of predetermined guard intervals until a correct guard interval is determined and confirm the correct guard interval by analyzing a checksum of the decoded at least one second preamble symbol, and if valid, to extract a guard interval of signaling information in the at least one decoded second preamble symbol.

16. The system of claim 15, further comprising a multiplexer coupled between the ADC and the demodulator and having a first input coupled to the ADC and having a second input coupled to the memory, the multiplexer to selectively provide one of the first input and the second input to the demodulator during the synchronization operation.

17. The system of claim 15, further comprising a multiplexer coupled between the front end portion and the FFT engine of the demodulator and having a first input coupled to the front end portion and having a second input coupled to the memory, the multiplexer to selectively provide one of the first input and the second input to the FFT engine during the synchronization operation.

18. The system of claim 16, wherein the synchronization logic is to cause the multiplexer to selectively provide the second input to the demodulator for a plurality of iterations to decode the at least one second preamble symbol and complete synchronization using data symbols of the frame.

19. The system of claim 17, wherein the synchronization logic is to cause the multiplexer to selectively provide the second input to the demodulator for a plurality of iterations to decode the at least one second preamble symbol and complete synchronization using data symbols of the frame.

* * * * *